(12) United States Patent
Hamaguchi et al.

(10) Patent No.: US 8,901,922 B2
(45) Date of Patent: Dec. 2, 2014

(54) RELATIVE ANGLE SENSING DEVICE

(75) Inventors: Yusuke Hamaguchi, Tochigi (JP); Yohei Hama, Tochigi (JP)

(73) Assignee: Showa Corporation, Saitama (JP)

( * ) Notice: Subject to any disclaimer, the term of this patent is extended or adjusted under 35 U.S.C. 154(b) by 374 days.

(21) Appl. No.: 13/417,942

(22) Filed: Mar. 12, 2012

(65) Prior Publication Data

US 2013/0063136 A1 Mar. 14, 2013

(30) Foreign Application Priority Data

Sep. 14, 2011 (JP) .................. 2011-200399

(51) Int. Cl.
*G01B 7/30* (2006.01)
*G01L 3/10* (2006.01)
*G01D 5/14* (2006.01)

(52) U.S. Cl.
CPC ............... *G01L 3/104* (2013.01); *G01D 5/145* (2013.01)
USPC .................................. 324/207.25; 73/862.08

(58) Field of Classification Search
CPC .... B62D 6/10; B62D 15/0215; B62D 5/0463; B62D 15/02; B62D 15/021; G01L 5/221; G01L 3/104; G01L 3/101; G01L 3/102; G01L 3/105; G01L 3/103; G01L 3/109; G01L 3/12; G01L 3/242; G01L 17/00; G01L 25/003; G01L 3/107

USPC ............ 180/443, 444, 446, 447; 324/207.13, 324/207.21, 207.22, 207.25, 251, 750.3; 73/862.08, 862.193
See application file for complete search history.

(56) References Cited

U.S. PATENT DOCUMENTS

2011/0000319 A1* 1/2011 Maehara .................. 73/862.193

FOREIGN PATENT DOCUMENTS

| DE | 10 2006 023883 | 11/2007 |
|---|---|---|
| EP | 2 270 456 | 1/2011 |
| JP | 2007-292550 | 11/2007 |

* cited by examiner

*Primary Examiner* — Melissa Koval
*Assistant Examiner* — Daniel Miller
(74) *Attorney, Agent, or Firm* — Leason Ellis LLP

(57) ABSTRACT

A relative angle sensing device that senses a relative rotation angle between first and second rotary shafts includes: a rotary component that is provided on one rotary shaft out of the first rotary shaft and the second rotary shaft, and that rotates together with the one rotary shaft; a supported component that generates a magnetic field and that is supported by the rotary component through an adhesive material; and a sensor that is provided in the other rotary shaft out of the first rotary shaft and the second rotary shaft, and that outputs a value corresponding to the magnetic field generated by the supported component. A transmitting unit is provided between the rotary component and the supported component. The transmitting unit transmits rotative force of the one rotary shaft to the supported component by direct contact with each other in a case of peeling of the adhesive material.

4 Claims, 18 Drawing Sheets

AMOUNT OF CHANGE IN RESISTANCE

ANGLE ($\theta$)

RESISTANCE VALUE

ANGLE ($\theta$)

CONFIGURATION OF ELEMENT

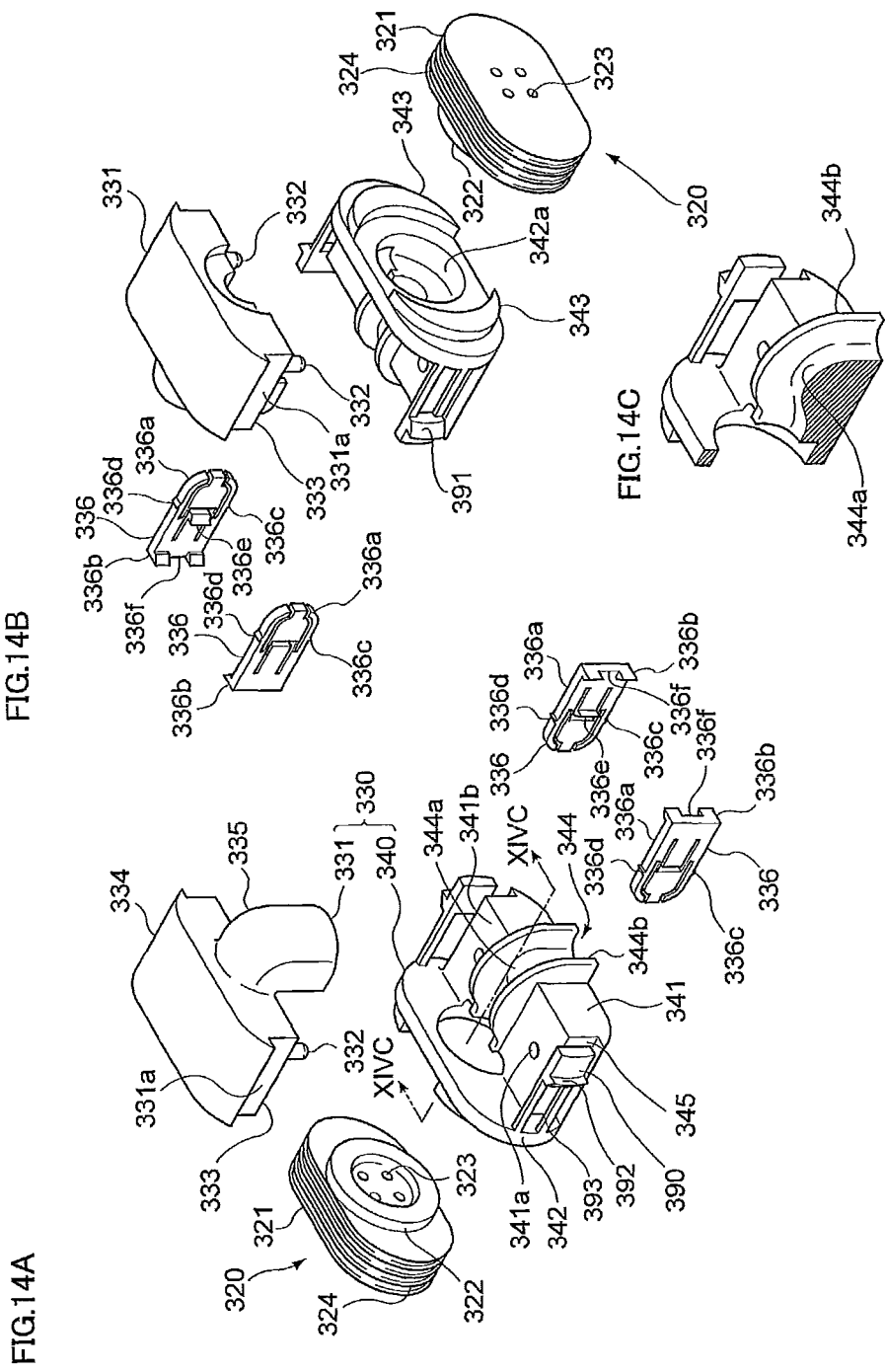

RELATIVE ANGLE SENSING DEVICE

CROSS REFERENCE TO RELATED APPLICATIONS

This application is based on and claims priority under 35 USC §119 from Japanese Patent Application No. 2011-200399 filed Sep. 14, 2011.

BACKGROUND

1. Technical Field

The present invention relates to a relative angle sensing device.

2. Related Art

Recently, there has been suggested a device for sensing a relative rotation angle between two rotary shafts coaxially arranged.

For example, a device described in Japanese Patent Application Laid Open Publication No. 2007-292550 is applied to an electric power steering apparatus, and is a device for sensing torque between an input shaft and an output shaft. The input shaft and the output shaft are connected with each other through a torsion bar. A magnetic generator is provided on the input shaft. The magnetic generator has a configuration in which a circular magnetic part is arranged on a back yoke formed of a circular magnetic body. A magnetic yoke part formed of a first magnetic yoke and a second magnetic yoke is arranged on the output shaft. The other end parts of the first magnetic yokes are connected with each other by a first magnetic ring, and the other end parts of the second magnetic yokes are connected with each other by a second magnetic ring. A first magnetic concentration ring is arranged on a housing so as to face the first magnetic ring. A second magnetic concentration ring is arranged on the housing so as to face the second magnetic ring. A first magnetic concentration yoke is arranged on the first magnetic concentration ring, and a second magnetic concentration yoke is arranged on the second magnetic concentration ring. Two pairs of convex parts are arranged on the first magnetic concentration yoke and the second magnetic concentration yoke, respectively, so as to face each other. Space between each pair of the convex parts is a magnetic gap, and a magnetic sensor is arranged inside the magnetic gap.

As a method for forming the magnetic generator, there has been suggested a method in which adhesive material is applied onto the rear surface of the magnetic body before magnetization, the magnetic body before magnetization is adhered to the back yoke with the adhesive material, and the magnetic body is magnetized after the back yoke is inserted into the input shaft with pressure.

In a case of peeling of the adhesive material between the back yoke and the magnet part (magnetic body after magnetization) configuring the magnetic generator, it is feared that the magnet part does not rotate together with one rotary shaft (for example, an input shaft) out of the two rotary shafts, and the relative rotation angle between the two rotary shafts is not sensed.

The present invention is intended to suggest a device that is able to sense a relative rotation angle between two rotary shafts even in a case of peeling of the adhesive material.

SUMMARY

According to an aspect of the present invention, there is provided a relative angle sensing device that senses a relative rotation angle between a first rotary shaft and a second rotary shaft, the relative angle sensing device including: a rotary component that is provided on one rotary shaft out of the first rotary shaft and the second rotary shaft, and that rotates together with the one rotary shaft; a supported component that generates a magnetic field and that is supported by the rotary component through an adhesive material; and a sensor that is provided in the other rotary shaft out of the first rotary shaft and the second rotary shaft, and that outputs a value corresponding to the magnetic field generated by the supported component. A transmitting unit is provided between the rotary component and the supported component, the transmitting unit transmitting rotative force of the one rotary shaft to the supported component by direct contact with each other in a case of peeling of the adhesive material.

Here, the transmitting unit includes a convex part that is provided in any one of the rotary component and the supported component and a concave part that is provided in the other one of the rotary component and the supported component; and the supported component is supported by the rotary component through the adhesive material in a state where the convex part and the concave part are fitted with each other, and the rotative force of the one rotary shaft is transmitted by direct contact between the convex part and the concave part in the case of peeling of the adhesive material.

Further, length of the convex part or the concave part provided in the supported component in a shaft direction of the one rotary shaft is not less than length obtained by adding, to contact length between the convex part and the concave part sufficient to transmit the rotative force of the one rotary shaft to the supported component, length between an end part of the supported component on the other rotary shaft side and the other rotary shaft on which the supported component is placed as a result of falling down in the case of peeling of the adhesive material and/or a component that rotates together with the other rotary shaft in a state where the supported component is supported by the rotary component through the adhesive material.

According to another aspect of the present invention, there is provided a relative angle sensing device that senses a relative rotation angle between a first rotary shaft and a second rotary shaft, the relative angle sensing device including: a rotary component that is provided on one rotary shaft out of the first rotary shaft and the second rotary shaft, and that rotates together with the one rotary shaft; a supported component that generates a magnetic field and that is supported by the rotary component through an adhesive material; and a sensor that is provided in the other rotary shaft out of the first rotary shaft and the second rotary shaft, and that outputs a value corresponding to the magnetic field generated by the supported component. A convex part is provided in any one of the rotary component and the supported component and a concave part is provided in the other one of the rotary component and the supported component; and the supported component is supported by the rotary component through the adhesive material in a state where the convex part and the concave part are fitted with each other.

Further, length of the convex part or the concave part provided in the supported component in a shaft direction of the one rotary shaft is not less than length obtained by adding, to contact length between the convex part and the concave part sufficient to transmit the rotative force of the one rotary shaft to the supported component, length between an end part of the supported component on the other rotary shaft side and the other rotary shaft on which the supported component is placed as a result of falling down in the case of peeling of the adhesive material and/or a component that rotates together with the other rotary shaft in a state where the supported component is supported by the rotary component through the adhesive material.

According to the present invention, it is possible to sense a relative rotation angle between two rotary shafts even in a case of peeling of an adhesive material.

BRIEF DESCRIPTION OF THE DRAWINGS

Exemplary embodiment(s) of the present invention will be described in detail based on the following figures, wherein:

FIGS. 14A to 14C are schematic views of the grommet and the socket;

DETAILED DESCRIPTION

Hereinafter, an exemplary embodiment of the present invention will be described in detail with reference to the attached drawings.

Figure 1A:
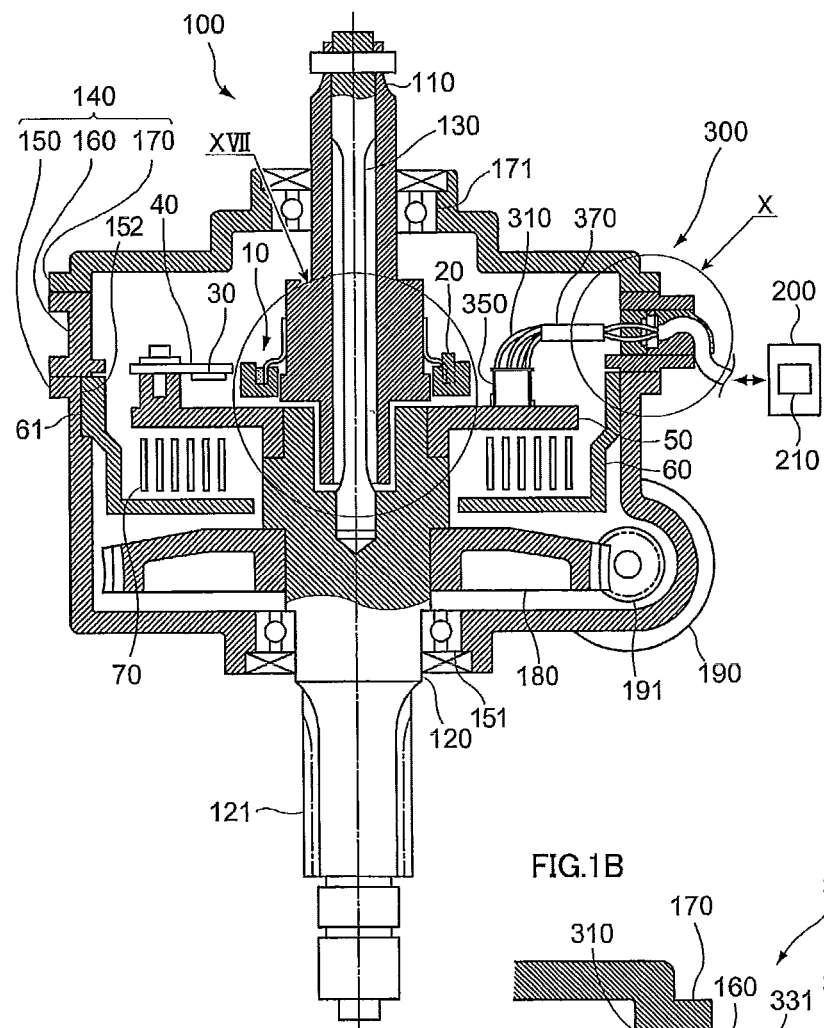
FIGS. 1A and 1B are cross-sectional views of an electric power steering apparatus to which a sensing device according to the exemplary embodiment is applied.
Figure 1B:
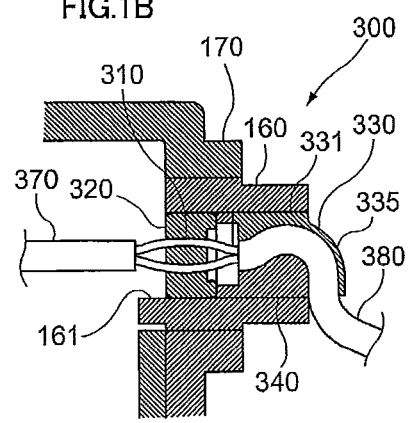
Figure 2:
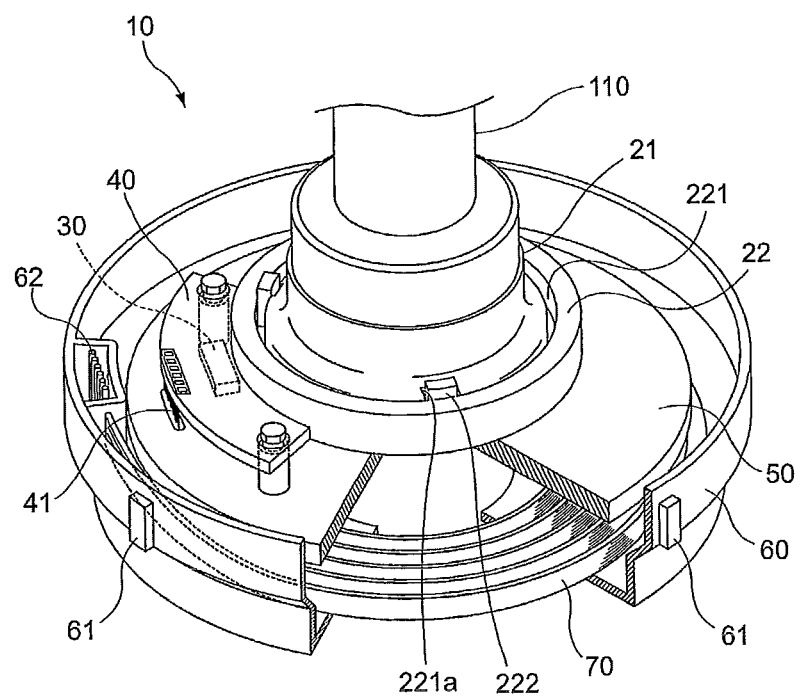
FIG. 2 is a perspective view of the sensing device according to the exemplary embodiment.

FIGS. 1A and 1B are cross-sectional views of an electric power steering apparatus 100 to which a sensing device 10 according to the exemplary embodiment is applied. FIG. 2 is a perspective view of the sensing device 10 according to the exemplary embodiment. Note that, in order to easily understand the configuration, a part of a base 50 and a flat cable cover 60 that will be described later is omitted in FIG. 2.

The electric power steering apparatus 100 is provided with a first rotary shaft 110 and a second rotary shaft 120 that coaxially rotate. The first rotary shaft 110 is a rotary shaft to which, for example, a steering wheel is connected, and the second rotary shaft 120 is coaxially connected to the first rotary shaft 110 through a torsion bar 130. A pinion 121 formed on the second rotary shaft 120 is engaged with a rack (not shown) of a rack shaft (not shown) which is connected to wheels, and rotary movement of the second rotary shaft 120 is converted into linear movement of the rack shaft through the pinion 121 and the rack, and thereby the wheels are steered.

The electric power steering apparatus 100 is provided with a housing 140 that rotatably supports the first rotary shaft 110 and the second rotary shaft 120. The housing 140 is a component fixed to a body frame (hereinafter, referred to as a "vehicle" in some cases) of a vehicle such as an automobile, and is formed of a first housing 150, a second housing 160 and a third housing 170.

The first housing 150 is a component having a shaft bearing 151 that rotatably supports the second rotary shaft 120, on one end side of the second rotary shaft 120 (lower side in FIG. 1A) in a rotary shaft direction (hereinafter, simply referred to as a "shaft direction" in some cases), and an opening on the other end side (upper side in FIG. 1) in the shaft direction.

The second housing 160 is a component having openings at both ends in the shaft direction, and is arranged so that one opening on one end side in the shaft direction faces the opening of the first housing 150 on the other end side in the shaft direction. The second housing 160 is fixed to the first housing 150 with, for example a bolt or the like. On the side surface of the second housing 160, a communication hole 161 for communicating the inside and the outside thereof is formed. The communication hole 161 includes an inner communication hole 161a with which a later-described grommet 320 of a harness comp 300 is fitted and that is approximately formed into an elliptic cylinder, and an outer communication hole 161b with which a socket 330 of the harness comp 300 is fitted and that is approximately formed into an elliptic cylinder. The outer communication hole 161b has the short side of the ellipse having the same length as that of the inner communication hole 161a, and a longer long side thereof than the inner communication hole 161a.

The second housing 160 has concave parts 162 (refer to FIGS. 15A and 15B) that are located in the middle of the communication hole 161 in the cylindrical direction of the elliptic cylinder (communication-hole direction), that are concave from a surface forming the outer communication hole 161b of the communication hole 161, and that are formed on both sides in the long side direction of the ellipse. Each of the concave parts 162 is a semicircular column, and has two vertical surfaces 162a vertical to the cylindrical direction.

The third housing 170 is a component having a shaft bearing 171 that rotatably supports the first rotary shaft 110 on the other end side in the shaft direction (upper side in FIG. 1A), and an opening on one end side in the shaft direction (lower side in FIG. 1). The third housing 170 is arranged so that the opening on one end side in the shaft direction faces the opening of the second housing 160 on the other end side in the shaft direction, and is fixed to the second housing 160 with, for example, a bolt or the like.

The electric power steering apparatus 100 is provided with: a worm wheel 180 that is fixed to the second rotary shaft 120 by, for example, press fitting; and an electric motor 190 that has a worm gear 191 engaged with the worm wheel 180 and connected to the output shaft, and that is fixed to the first housing 150.

The electric power steering apparatus 100 is provided with: the sensing device 10 that outputs an electric signal corresponding to the relative rotation angle between the first rotary shaft 110 and the second rotary shaft 120; and an electronic control unit (ECU) 200 that controls driving of the electric motor 190 on the basis of the output value of the sensing device 10.

The ECU 200 includes a relative angle calculator 210 that calculates the relative rotation angle between the first rotary shaft 110 and the second rotary shaft 120 on the basis of the output value from the sensing device 10 by using a CPU that executes various kinds of arithmetic processing, a ROM in which programs executed by the CPU, various kinds of data and the like are stored, and a RAM used as a working memory for the CPU and the like.

Detailed description of the sensing device 10 will be given later.

In the electric power steering apparatus 100 having the aforementioned configuration, since steering torque applied to the steering wheel appears as the relative rotation angle between the first rotary shaft 110 and the second rotary shaft 120, the steering torque is recognized on the basis of the relative rotation angle between the first rotary shaft 110 and the second rotary shaft 120. That is, the relative rotation angle between the first rotary shaft 110 and the second rotary shaft 120 is sensed by the sensing device 10, the ECU 200 recognizes the steering torque on the basis of the output value from the sensing device 10, and driving of the electric motor 190 is controlled on the basis of the recognized steering torque. Then, the generated torque of the electric motor 190 is transmitted to the second rotary shaft 120 through the worm gear 191 and the worm wheel 180. Thereby, the generated torque of the electric motor 190 assists steering force of a driver applied to the steering wheel.

Hereinafter, detailed description will be given for the sensing device 10.

The sensing device 10 is provided with: a rotary component 21 that is provided on the first rotary shaft 110 and that rotates together with the first rotary shaft 110; a magnet 22 that generates a magnetic field and that is supported by the rotary component 21 with an adhesive material; a relative angle sensor 30 that outputs an electric signal corresponding to the relative rotation angle between the first rotary shaft 110 and the second rotary shaft 120 on the basis of the magnetic field generated by the magnet 22; and a printed substrate 40 on which the relative angle sensor 30 is mounted. Further, the sensing device 10 is provided with: the base 50 that is attached to the second rotary shaft 120 and that supports the printed substrate 40; and the flat cable cover 60 in which a later-described flat cable 70 is contained, and that is formed into a cylinder with a bottom. Furthermore, the sensing device 10 is provided with: the flat cable 70 that has one end connected to a terminal arranged on the printed substrate 40, and the other end connected to a terminal fixed to the flat cable cover 60; and the harness comp 300 that connects the ECU 200 and the terminal fixed to the flat cable cover 60. Although detailed description will be given later for the rotary component 21 and the magnet 22, north poles and south poles of the magnet 22 are alternately arranged in the circumferential direction of the first rotary shaft 110, and the magnet 22 is magnetized in the circumferential direction.

The relative angle sensor 30 is arranged outside the outer circumferential surface of the magnet 22 in a rotational radial direction of the first rotary shaft 110, and within a region in which the magnet 22 is provided in the shaft direction of the first rotary shaft 110. The relative angle sensor 30 according to the exemplary embodiment is a MR sensor (magnetoresistive element) that is a magnetic sensor using change in resistance by a magnetic field. The relative angle sensor 30 outputs the electric signal corresponding to the relative rotation angle between the first rotary shaft 110 and the second rotary shaft 120 on the basis of the magnetic field generated by the magnet 22, and thereby the relative rotation angle between the two rotary shafts that are coaxially arranged is sensed. Detailed description will be given later for the relative angle sensor 30 and the sensing method of the relative rotation angle.

The printed substrate 40 is fixed to the base 50 with, for example, a bolt or the like so as to be arranged outside the outer circumferential surface of the magnet 22 in the rotational radial direction of the first rotary shaft 110.

The base 50 is a disc-shaped component, is fitted with the second rotary shaft 120, and rotates together with the second rotary shaft 120.

The flat cable cover 60 is a cylindrical component with a bottom, and is fixed to the housing 140. The following configuration is exemplified as a configuration in which the flat cable cover 60 is fixed to the housing 140. That is, plural convex parts 61 that are arranged on the outer circumferential surface of the flat cable cover 60 at regular intervals in the circumferential direction (4 convex parts arranged at intervals of 90 degrees in the exemplary embodiment) are formed so as to extend outside. On the other hand, on the first housing 150 of the housing 140, concave parts 152 the number of which is the same as the number of the convex parts 61 are formed, with which the convex parts 61 are fitted. By fitting the convex parts 61 of the flat cable cover 60 with the concave parts 152 formed on the first housing 150, the second rotary shaft 120 is positioned in the rotational direction. Further, by pressing the upper surface of the flat cable cover 60 with the second housing 160, positioning is conducted in the shaft direction. Alternatively, the flat cable cover 60 may be fixed to the first housing 150 or the second housing 160 with, for example, a bolt or the like.

One end of the flat cable 70 is connected to a terminal 41 of the printed substrate 40, the other end of the flat cable 70 is connected to a connecting terminal 62 arranged inside the flat cable cover 60, and the flat cable 70 is contained in a space formed by the inside of the flat cable cover 60 and one end surface of the base 50 in a spirally wound state. The flat cable 70 is wound in a right-handed direction as shown in FIG. 2 when it is seen from the other end side in the shaft direction, and in a case where the steering wheel, that is, the first rotary shaft 110 and the second rotary shaft 120 are rotated in the right-handed direction, one end rotates in the right-handed direction according to the rotation of the second rotary shaft 120, and thus the number of windings increases in comparison with a neutral state in which the steering wheel is not rotated. On the other hand, in a case where the steering wheel is rotated in a left-handed direction, the number of windings decreases in comparison with the neutral state in which the steering wheel is not rotated.

The harness comp 300 has a function for transmitting the output signal from the relative angle sensor 30 to the ECU 200. Detailed description will be given later for the harness comp 300.

Hereinafter, description will be given for the relative angle sensor 30 according to the exemplary embodiment.

The relative angle sensor 30 according to the exemplary embodiment is a MR sensor (magnetoresistive element) using change in resistance according to a magnetic field.

First, an operating principle of the MR sensor will be described.

The MR sensor is formed of a Si or a glass substrate, and a thin film that is formed thereon and is made of an alloy mainly containing a ferromagnetic metal such as Ni—Fe, and the resistance of the thin-film ferromagnetic metal changes in accordance with intensity of a magnetic field in a specific direction.

Figure 3:
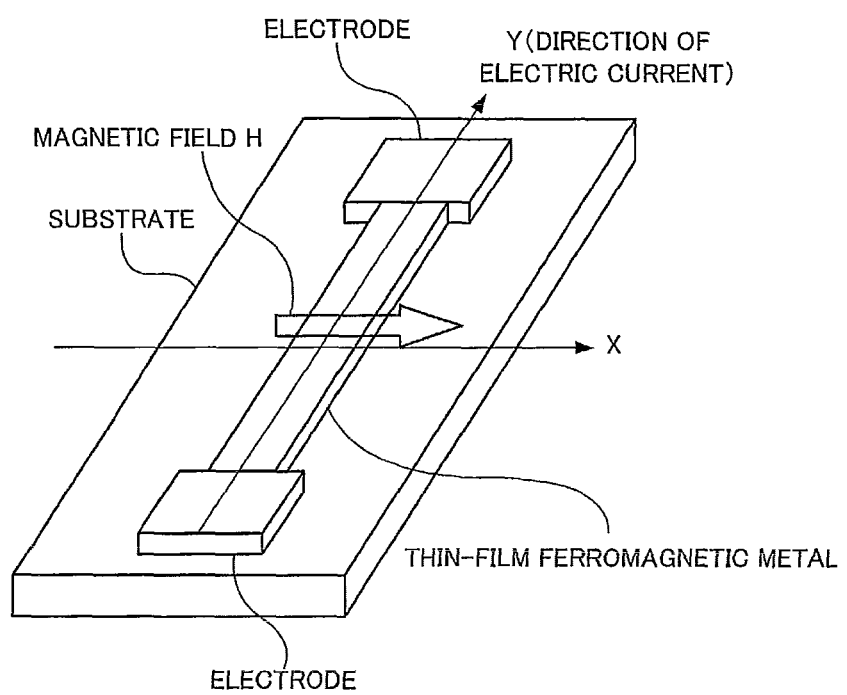
FIG. 3 is a view for illustrating a direction of an electric current applied to the thin-film ferromagnetic metal and a direction of an applied magnetic field.
Figure 4:
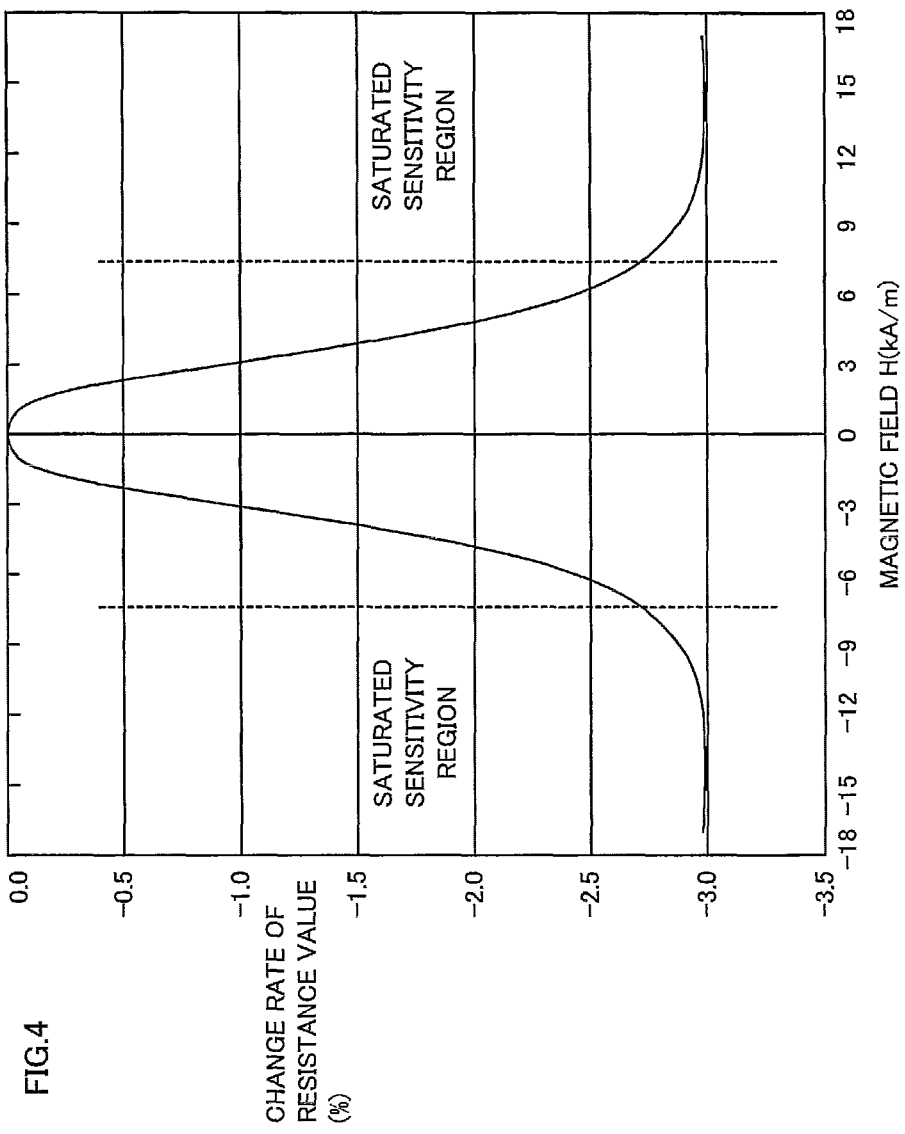
FIG. 4 is a graph for showing a relationship between intensity of the magnetic field and resistance of the thin-film ferromagnetic metal in a case where the intensity of the magnetic field is changed in the state shown in FIG. 3.

FIG. 3 is a view for illustrating a direction of an electric current applied to the thin-film ferromagnetic metal and a direction of an applied magnetic field. FIG. 4 is a graph for showing a relationship between intensity of the magnetic field and resistance of the thin-film ferromagnetic metal in a case where the intensity of the magnetic field is changed in the state shown in FIG. 3.

As shown in FIG. 3, an electric current is applied to the thin-film ferromagnetic metal forming into a rectangle on the substrate in a long side direction of the rectangle, that is, a Y direction in FIG. 3. On the other hand, a magnetic field H is applied thereto in a vertical direction (X direction in FIG. 3) with respect to the direction of the electric current (Y direction), and the intensity of the magnetic field is changed in this condition. It is FIG. 4 that shows how the resistance of the thin-film ferromagnetic metal is changed in such a condition.

As shown in FIG. 4, even if the intensity of the magnetic field is made to be changed, change in the resistance from a point at no magnetic field (point where the intensity of the magnetic field is zero) is up to approximately 3%.

Hereinafter, a region outside a region in which the amount of change in the resistance ($\Delta R$) is approximately represented by a formula, "$\Delta R \propto H^2$" is referred to as a "saturated sensitivity region." In the saturated sensitivity region, change in the resistance of 3% does not vary if the intensity of the magnetic field is not less than certain intensity (hereinafter, referred to as a "specified intensity of the magnetic field").

Figure 5:
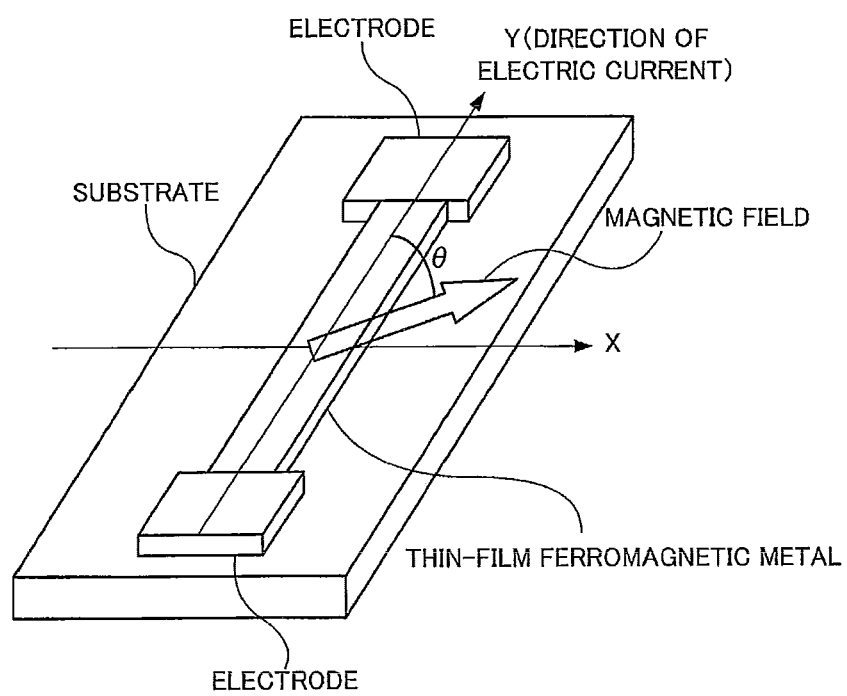
FIG. 5 is a view for illustrating a direction of an electric current applied to the thin-film ferromagnetic metal and a direction of an applied magnetic field.
Figure 6A:
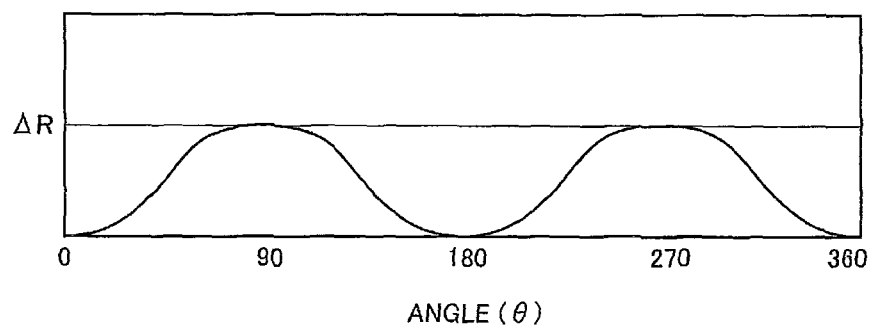
FIGS. 6A and 6B are graphs for showing a relationship between the direction of the magnetic field and the resistance of the thin-film ferromagnetic metal.
Figure 6B:
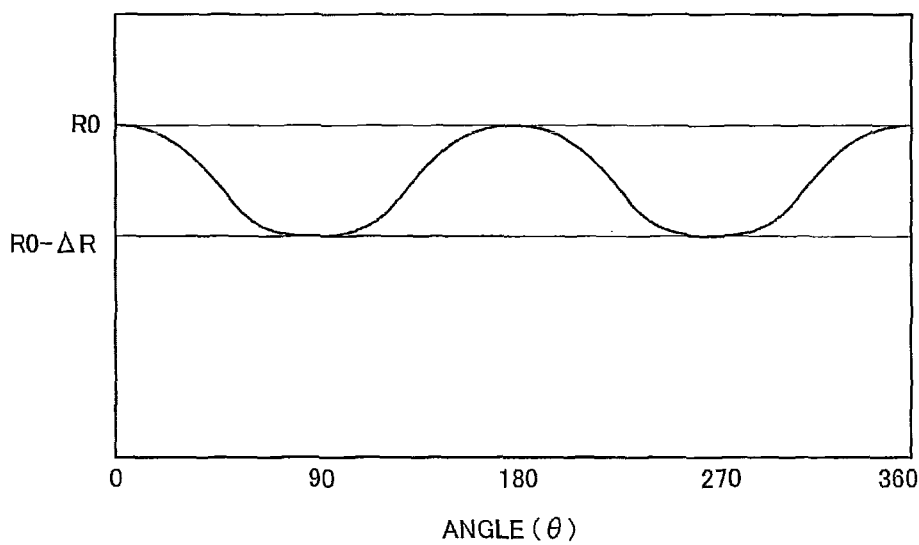

FIG. 5 is a view for illustrating a direction of an electric current applied to the thin-film ferromagnetic metal and a direction of an applied magnetic field. FIGS. 6A and 6B are graphs for showing a relationship between the direction of the magnetic field and the resistance of the thin-film ferromagnetic metal.

As shown in FIG. 5, an electric current is made to flow in a direction of the long side of the rectangle forming the thin-film ferromagnetic metal, that is, a Y direction in FIG. 5, and, as a direction of the magnetic field, change of an angle θ is given with respect to the direction of the electric current. At this time, in order to recognize change in the resistance of the thin-film ferromagnetic metal due to the direction of the magnetic field, the intensity of the magnetic field applied thereto is not less than the aforementioned specified intensity of the magnetic field at which the resistance does not change due to the intensity of the magnetic field.

As shown in FIG. 6A, the amount of change in the resistance is maximum when the direction of the electric current and the direction of the magnetic field are vertical to each other (θ=90 degrees, or 270 degrees), and is minimum when the direction of the electric current and the direction of the magnetic field are parallel to each other (θ=0 degree, or 180 degrees). If the maximum amount of change in the resistance in this case is set as $\Delta R$, the resistance of the thin-film ferromagnetic metal R changes as an angular component between the direction of the electric current and the direction of the magnetic field, is represented by an equation (1), and is shown in FIG. 6B.

$$R = R0 - \Delta R \sin^2\theta \quad (1)$$

Herein, R0 denotes the resistance in a case where the magnetic field not less than the specified intensity of the magnetic field is applied thereto so as to be parallel to the direction of the electric current (θ=0 degree or 180 degrees).

By the equation (1), the direction of the magnetic field not less than the specified intensity of the magnetic field can be sensed by recognizing the resistance of the thin-film ferromagnetic metal.

Next, a sensing principle of the MR sensor will be described.

Figure 7A:
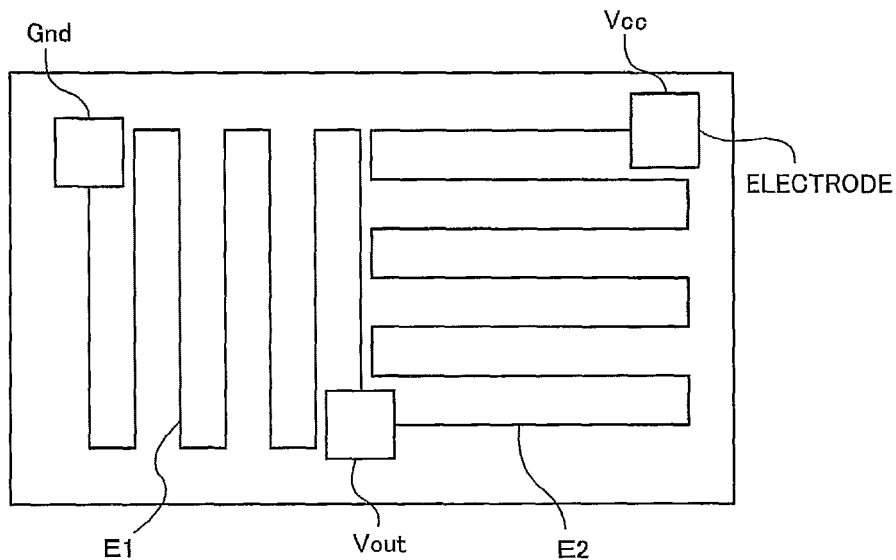
FIG. 7A is a view for illustrating an example of the MR sensor using a principle for sensing a direction of a magnetic field under intensity of a magnetic field not less than the specified intensity of the magnetic field.
Figure 7B:
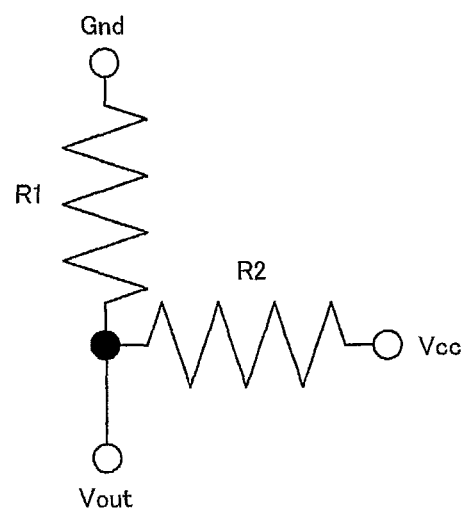
FIG. 7B is a view for illustrating the configuration of the MR sensor shown in FIG. 7A as an equivalent circuit.

FIG. 7A is a view for illustrating an example of the MR sensor using a principle for sensing a direction of a magnetic field under intensity of a magnetic field not less than the specified intensity of the magnetic field. FIG. 7B is a view for illustrating the configuration of the MR sensor shown in FIG. 7A as an equivalent circuit.

In the thin-film ferromagnetic metal of the MR sensor shown in FIG. 7A, a first element E1 that is formed so as to have a longer side in the vertical direction and a second element E2 that is formed so as to have a longer side in the horizontal direction are arranged in series.

In the thin-film ferromagnetic metal having such a shape, the magnetic field in the vertical direction, which leads to the maximum change in the resistance with respect to the first element E1, leads to the minimum change in the resistance with respect to the second element E2. The resistance R1 of the first element E1 is given by an equation (2), and the resistance R2 of the second element E2 is given by an equation (3).

$$R1 = R0 - \Delta R \sin^2\theta \quad (2)$$

$$R2 = R0 - \Delta R \cos^2\theta \quad (3)$$

The equivalent circuit of the MR sensor having the element configuration shown in FIG. 7A is shown in FIG. 7B.

As shown in FIGS. 7A and 7B, in a case where an end of the first element E1, which is not connected to the second element E2, is set as a ground (Gnd), and an end of the second element E2, which is not connected to the first element E1, is set to have an output voltage of Vcc, an output voltage Vout at a connecting part between the first element E1 and the second element E2 is given by an equation (4).

$$V\text{out} = (R1/(R1+R2)) \times V\text{cc} \quad (4)$$

When the equations (2) and (3) are substituted into the equation (4) and the resultant equation is reorganized, an equation (5) is obtained.

$$V\text{out} = V\text{cc}/2 + \alpha \times \cos 2\theta \quad (5)$$

Herein, $\alpha = (\Delta R/(2 \times R0 - \Delta R)) \times V\text{cc}$.

By the equation (5), the direction of the magnetic field is recognized by sensing the Vout.

FIGS. 8A to 8D are views for illustrating a relationship between the change of the direction of the magnetic field and the output of the MR sensor when the magnet moves in a straight line.

Figure 8A:
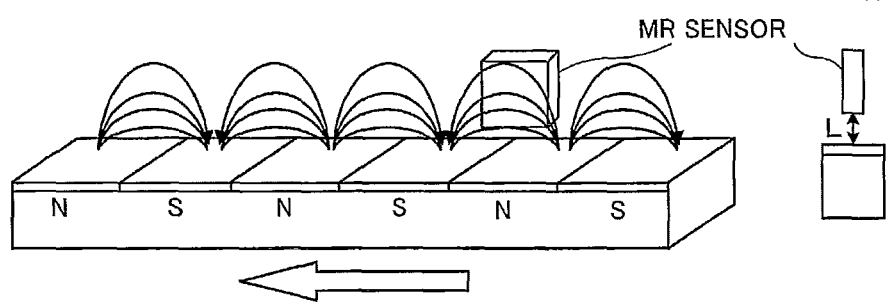
FIGS. 8A to 8D are views for illustrating a relationship between the change of the direction of the magnetic field and the output of the MR sensor when the magnet moves in a straight line.
Figure 8B:
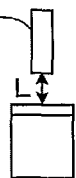

As shown in FIG. 8A, the MR sensor shown in FIGS. 7A and 7B is arranged with respect to the magnet in which north poles and south poles are alternately arranged so that the intensity of the magnetic field not less than the specified intensity of the magnetic field is applied thereto with a gap L (distance between the magnet and the MR sensor), and change of the direction of the magnetic field affects a sensor surface of the MR sensor.

Figure 8C:
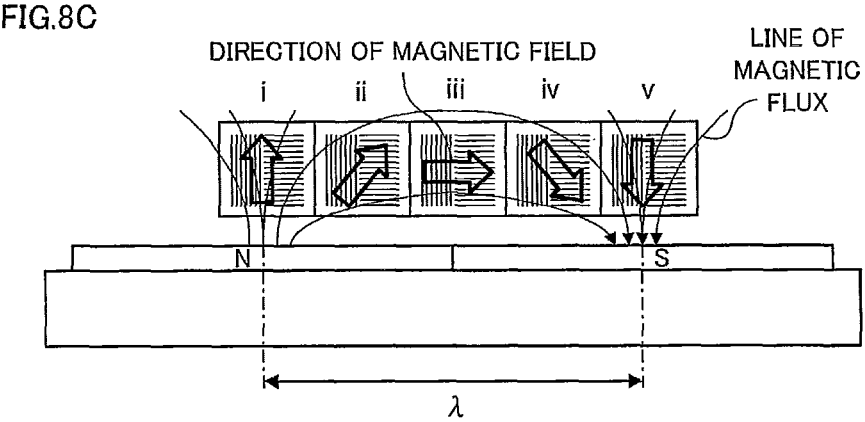
Figure 8D:
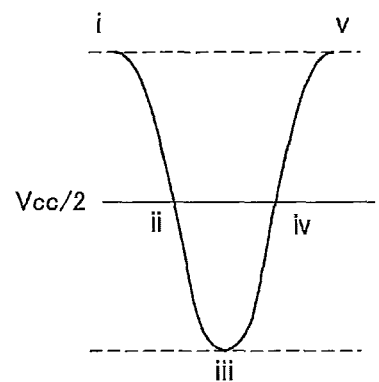

Then, the magnet is made to move to the left as shown in FIG. 8A, by a distance from the center of the north pole to the center of the south pole (hereinafter, referred to as a "magnetized pitch" in some cases) of λ, which is shown in FIG. 8C. In this case, the magnetic field whose direction is shown with an arrow in FIG. 8C is applied to the MR sensor according to the position of the magnet, and the direction of the magnetic field is half rotated on the sensor surface when the magnet moves by the magnetized pitch λ. Hence, a waveform of the output voltage Vout at the connecting part between the first element E1 and the second element E2 has one cycle as shown in FIG. 8D because of the equation (5), "Vout=Vcc/2+α× cos2θ."

Figure 9A:
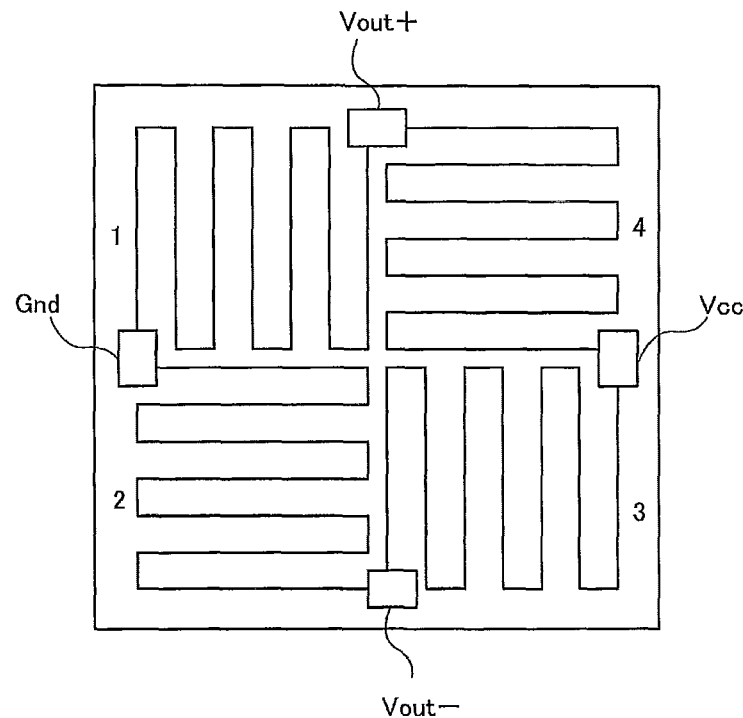
FIGS. 9A and 9B are views for illustrating another example of the MR sensor.
Figure 9B:
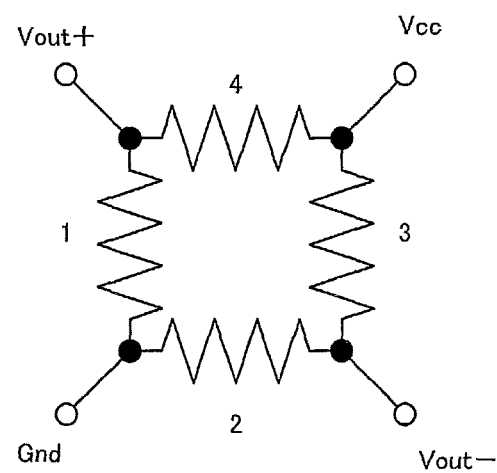

FIGS. 9A and 9B are views for illustrating another example of the MR sensor.

Instead of the element configuration shown in FIGS. 7A and 7B, if an element configuration shown in FIG. 9A is adopted, a well-known configuration having a Wheatston bridge (full bridge) is achieved, as shown in FIG. 9B. Thus, by using the MR sensor having the element configuration shown in FIG. 9A, it is possible to enhance a sensing accuracy.

Description will be given for a method for sensing a moving direction of the magnet.

From the relationship between the direction of the magnetic field and the resistance of the thin-film ferromagnetic metal shown in FIGS. 6A and 6B and the equation (1), "R=R0−ΔRsin$^2$θ," the resistance of the thin-film ferromagnetic metal is the same in both cases in which the direction of the magnetic field is made to be rotated in a clockwise direction, and in a counterclockwise direction when it is seen in FIG. 5. Accordingly, although the resistance of the thin-film ferromagnetic metal is recognized, the moving direction of the magnet is not recognized.

Figure 10:
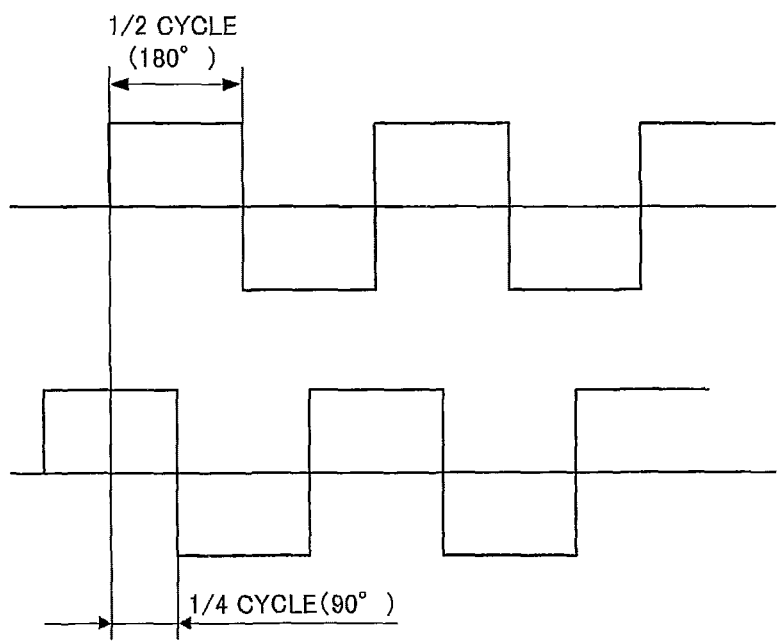
FIG. 10 is a diagram for illustrating one example of a combination of outputs used for sensing a moving direction of the magnet.

FIG. 10 is a diagram for illustrating one example of a combination of outputs used for sensing a moving direction of the magnet. As shown in FIG. 10, by combining two outputs having phase difference of a quarter cycles, the moving direction of the magnet can be sensed. In order to obtain these outputs, two MR sensors are arranged so as to have a phase relationship such as (i) and (ii) or (i) and (iv) shown in FIG. 8C.

Figure 11A:
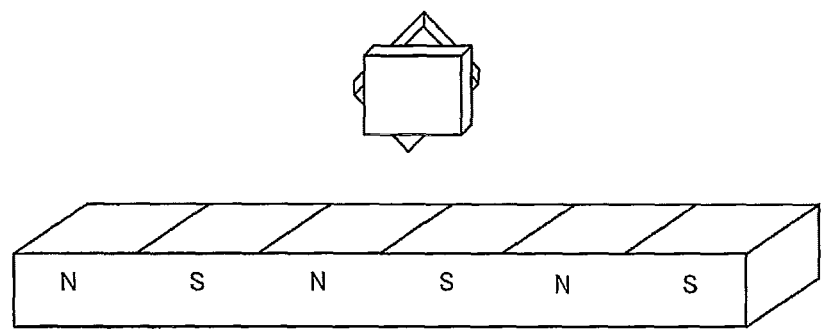
FIGS. 11A and 11B are views for illustrating an example of an arrangement of the MR sensors.
Figure 11B:
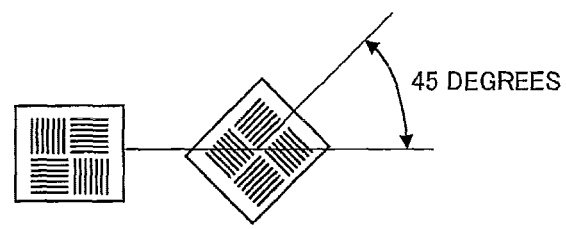

FIGS. 11A and 11B are views for illustrating an example of an arrangement of the MR sensors. As shown in FIGS. 11A and 11B, two MR sensors may be stacked and one MR sensor may be arranged to have an angle of 45 degrees with respect to the other sensor.

Figure 12A:
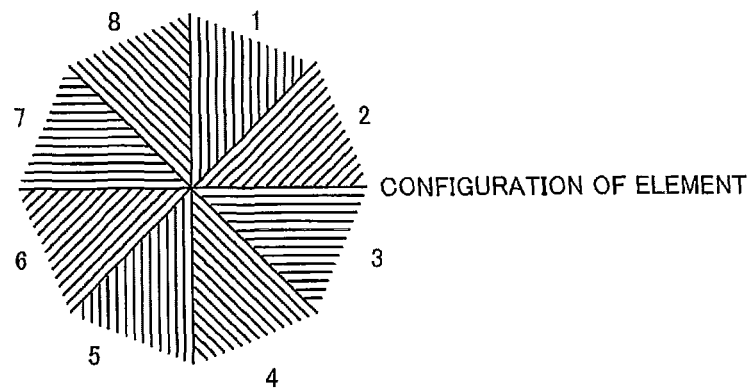
FIGS. 12A to 12C are diagrams for illustrating another example of the MR sensor.
Figure 12B:
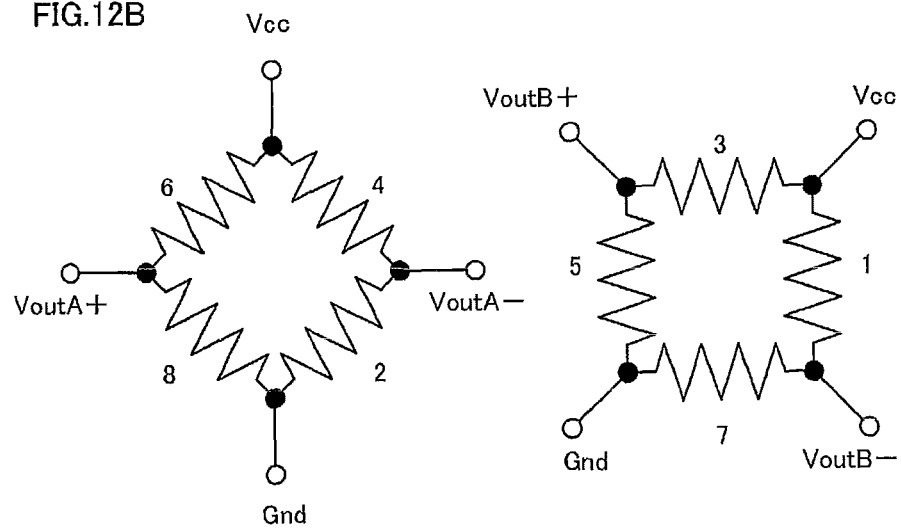
Figure 12C:
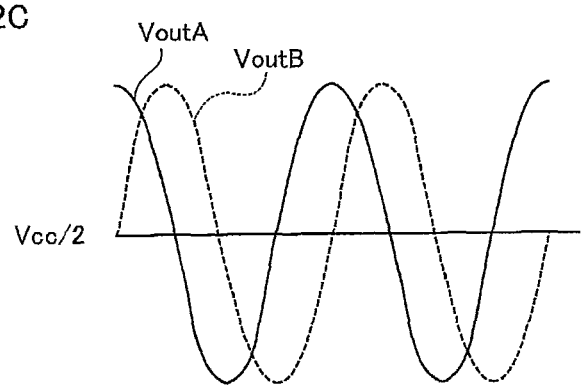

FIGS. 12A to 12C are diagrams for illustrating another example of the MR sensor. As shown in FIG. 12A, two pairs of elements each having a full-bridge configuration are formed on one substrate so as to have an angle of 45 degrees with respect to each other, and the element configuration forming an equivalent circuit shown in FIG. 12B may be considered. By this configuration, as shown in FIG. 12C, it is possible to output accurate sine and cosine waves by one MR sensor. Thus, the moving direction and the amount of the movement of the magnet with respect to the MR sensor are recognized by the output value of the MR sensor having the element configuration shown in FIGS. 12A to 12C.

In consideration of the aforementioned characteristics of the MR sensor, the MR sensor having the element configuration shown in FIGS. 12A to 12C is used as the relative angle sensor 30 in the sensing device 10 according to the exemplary embodiment. The relative angle sensor 30 is vertically arranged with respect to the outer circumferential surface of the magnet 22, and the position of the second rotary shaft 120 in the shaft direction is within the region of the magnet 22, as described above. Thus, in this case, the relative angle sensor 30 shows change of the direction of the magnetic field shown in FIG. 8C in accordance with the position of the magnet 22 by the magnetic field of the magnet 22 rotating together with the first rotary shaft 110.

As a result, when the magnet 22 moves (rotates) by the magnetized pitch A, the direction of the magnetic field half rotates on the magnetically sensitive surface of the relative angle sensor 30 and the output values VoutA and VoutB from the relative angle sensor 30 are cosine and sine curves (waves) having phase difference of the quarter cycles as shown in FIG. 12C, respectively.

That is, when a driver rotates the steering wheel, the first rotary shaft 110 also rotates according to this rotation, and the torsion bar 130 twists. Then, the second rotary shaft 120 rotates a little later than the first rotary shaft 110. This delay appears as difference between the rotation angles of the first rotary shaft 110 and the second rotary shaft 120 that are connected to the torsion bar 130. The sensing device 10 outputs VoutA and VoutB that are the cosine and sine curves having phase difference of the quarter cycles corresponding to the difference of the rotation angle.

Note that, the magnetically sensitive surface of the relative angle sensor 30 indicates a surface on which a magnetic field can be sensed in the relative angle sensor 30.

The relative angle calculator 210 of the ECU 200 calculates a relative rotation angle Ot between the first rotary shaft 110 and the second rotary shaft 120 by using a following equation (6) on the basis of the output values VoutA and VoutB of the relative angle sensor 30.

$$\theta t = \arctan(VoutB/VoutA) \quad (6)$$

As described above, it is possible for the relative angle calculator 210 to recognize the relative rotation angle between the first rotary shaft 110 and the second rotary shaft 120 and the twisting direction, that is, the amount and the direction of the torque applied to the steering wheel, on the basis of the output values from the relative angle sensor 30.

When the sensing device 10 having the aforementioned configuration is attached, the flat cable cover 60, the base 50 to which the printed substrate 40 has been attached, and the flat cable 70 contained between the flat cable cover 60 and the base 50 are unitized in advance. This unit is attached to the first housing 150 to which the second rotary shaft 120 has been attached so that the convex parts 61 of the flat cable cover 60 are fitted with the concave parts 152 of the first housing 150. At this time, the base 50 is attached to the second rotary shaft 120.

As described above, it is possible to improve an assembly property by making the sensing device 10 unitizable in advance.

Next, the harness comp 300 will be described.

Figure 13:
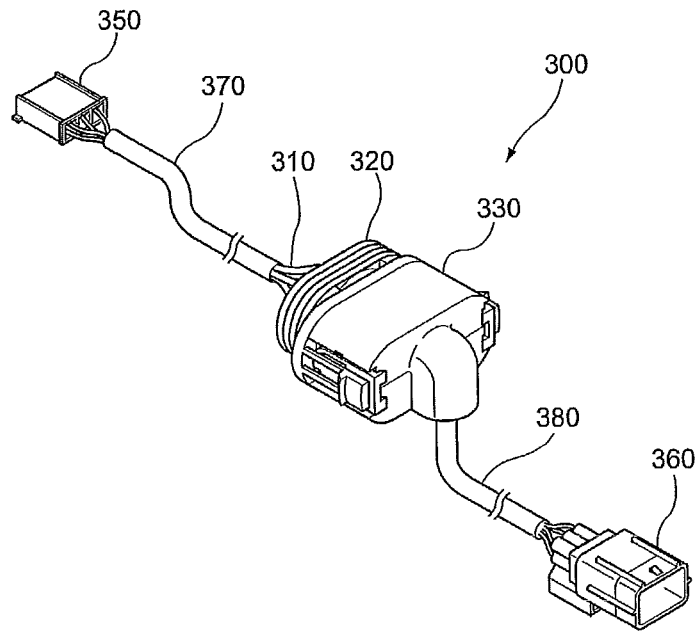
FIG. 13 is an external view of the harness comp according to the exemplary embodiment.

FIG. 13 is an external view of the harness comp 300 according to the exemplary embodiment.

The harness comp 300 is provided with: plural electric cables 310; the grommet 320 that holds the plural electric cables 310; and the socket 330 that keeps the grommet 320 from moving. Further, the harness comp 300 is provided with: a first connector 350 that is connected to one end of the plural electric cables 310; and a second connector 360 that is connected to the other end of the plural electric cables 310. Furthermore, the harness comp 300 is provided with: a first cover 370 that bundles the plural electric cables 310 between the grommet 320 and the first connector 350; and a second cover 380 that bundles the plural electric cables 310 between the grommet 320 and the second connector 360.

The harness comp 300 according to the exemplary embodiment has four electric cables 310, and one end of these four electric cables 310 is connected to the printed substrate 40 through the first connector 350 and the like, and the other end of these four electric cables 310 is connected to the ECU 200 through the second connector 360 and the like. The four electric cables 310 are used for electric supply from the ECU 200 to the relative angle sensor 30 and transmission of the output values from the relative angle sensor 30 to the ECU 200.

The electric cables 310 are an electric conductor such as a linearly elongated metal, which has been covered with an insulator, and have an electric conductivity. The harness comp 300 according to the exemplary embodiment has four electric cables 310, one end of these four electric cables 310 is connected to the first connector 350, the other end thereof is connected to the second connector 360, and they are bundled by the first cover 370 and the second cover 380 as an insulator.

FIGS. 14A to 14C are schematic views of the grommet 320 and the socket 330. FIG. 14A is a perspective view shown from the second connector 360 side, and FIG. 14B is a perspective view shown from the first connector 350 side. FIG. 14C is a cross-sectional view taken along a line XIVC-XIVC in FIG. 14A.

Figure 15A:
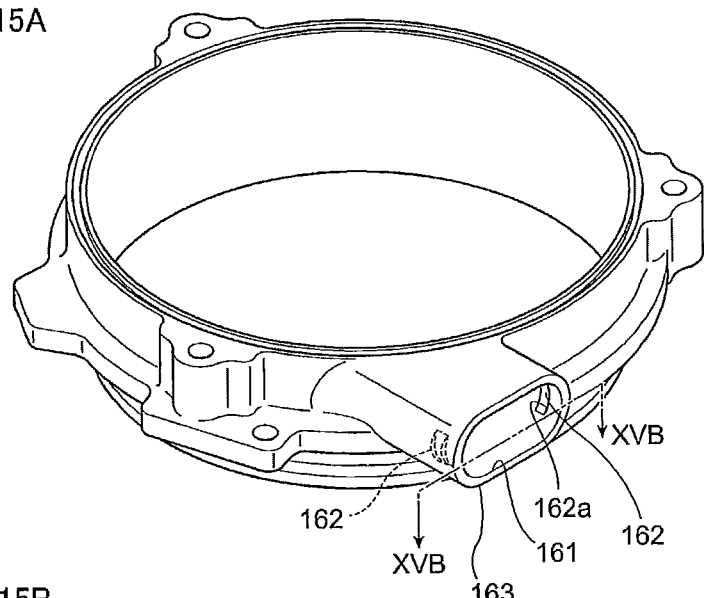
FIG. 15A is a schematic view of the second housing.
Figure 15B:
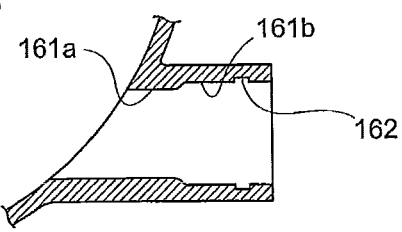
FIG. 15B is a cross-sectional view taken along a line XVB-XVB in FIG. 15A.
Figure 15C:
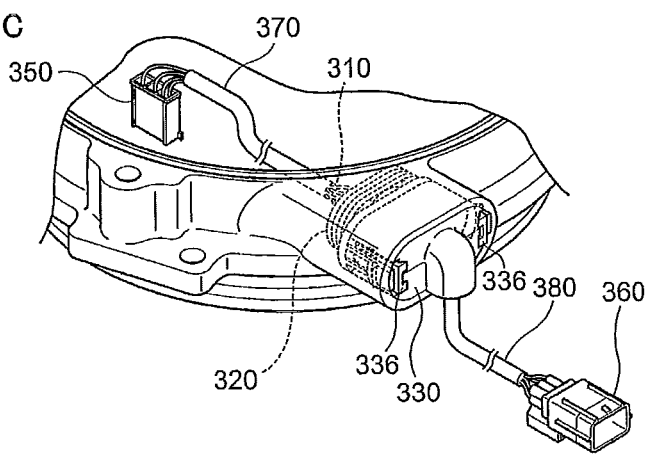
FIG. 15C is a view for illustrating the harness comp mounted on the second housing.

FIG. 15A is a schematic view of the second housing 160. FIG. 15B is a cross-sectional view taken along a line XVB-XVB in FIG. 15A. FIG. 15C is a view for illustrating the harness comp 300 mounted on the second housing 160.

The grommet 320 includes an elliptic cylindrical part 321 that is approximately formed into an elliptic cylinder, and a cylindrical part 322 that is formed into a cylinder. In the elliptic cylindrical part 321, electric cable holes 323 that are formed in a cylindrical direction for making the electric cables 310 pass therethrough are formed. Here, the number of the electric cable holes 323 is the same as the number of the electric cables 310 (in the exemplary embodiment, four electric cable holes 323 are formed). On the outer peripheral surface of the elliptic cylindrical part 321, plural projections 324 (three projections in the exemplary embodiment) that project from the outer peripheral surface to the outside are provided in the cylindrical direction (hole direction of the electric cable holes 323 (hereinafter, referred to as an "electric cable hole direction" in some cases)) throughout the whole periphery in the peripheral direction. The outermost peripheral part of the projection 324 has larger size than the inner communication hole 161a of the communication hole 161 of the second housing 160. The outer peripheral surface of the elliptic cylindrical part 321 has the same as or a little bit smaller than the inner peripheral surface of a peripheral wall 163 forming the inner communication hole 161 a of the communication hole 161 of the second housing 160. Thus, in a state where the grommet 320 is fitted with the second housing 160, by making the projections 324 projecting from the outer peripheral surface to the outside pressed by the peripheral wall 163, the elliptic cylindrical part 321 as a whole elastically deforms to the inner side. Accordingly, the grommet 320 seals the inner communication hole 161a of the communication hole 161 of the second housing 160, and presses the electric cables 310 inserted into the electric cable holes 323 at a peripheral parts of the electric cable holes 323, which suppress movement of the electric cables 310. Note that, the grommet 320 is formed by vulcanizing an elastic material such as rubber, and formed into the aforementioned shape.

The socket 330 has a pair of divided components that is able to be divided in a direction intersecting with the hole direction of the communication hole 161 of the second housing 160. In the exemplary embodiment, the pair is able to be divided in the shaft direction, and includes a lower component 340 that is arranged on the lower side, and an upper component 331 that is arranged on the upper side in FIG. 14A. Further, the socket 330 has plural detachment preventing components 336 (two detachment preventing components 336 in the exemplary embodiment) that are arranged between the lower component 340 and the upper component 331, and that prevent the socket 330 from being detached from the communication hole 161 of the second housing 160. The socket 330 is formed by injection molding of a resin and formed into a certain shape that will be described later.

The lower component 340 has a supporting part 341 that supports the upper component 331, and an elliptic cylindrical part 342 that is formed into an elliptic cylinder and in which a penetration hole 342a for making the plural electric cables 310 bundled by the second cover 380 pass therethrough is formed at the central part. The lower component 340 has, on both sides of the ellipse in the long side direction, two crescent cylindrical parts 343 that project outside from the end surface opposite to the side where the supporting part 341 of the elliptic cylindrical part 342 is arranged so as to be formed into a crescent cylinder. These supporting part 341, the elliptic cylindrical part 342 and the crescent cylindrical parts 343 are arrayed in this order from the second connector 360 side in the electric cable hole direction.

In the supporting part 341, a concave part 341a with which a later-described convex part 332 of the upper component 331 is fitted and a supporting surface 341b that supports a later-described lower surface 333 of the upper component 331 are formed. Two concave parts 341a and two supporting surfaces 341b are formed in the long side direction of the ellipse of the elliptic cylindrical part 342.

Further, in the supporting part 341, an electric cable passage 344 that is a passage for the plural electric cables 310 bundled by the second cover 380 is formed at the central part in the long side direction of the ellipse of the elliptic cylindrical part 342. The electric cable passage 344 has a placement surface 344a on which the lower part of the plural electric cables 310 bundled by the second cover 380 is placed, and is sectioned by two regulation walls 344b that regulate movement of the electric cables 310 toward the long side direction of the ellipse of the elliptic cylindrical part 342. The placement surface 344a in the electric cable hole direction is formed into a shape as shown in FIGS. 1A and 1B so that the part on the elliptic cylindrical part 342 side is parallel to the electric cable hole direction, the end part on the second connector 360 side extends toward the direction of one end of the shaft direction (downward in FIGS. 1A and 1B) and a part therebetween is formed into a shape like a mound rising toward the direction of the other end of the shaft direction (upward in FIGS. 1A and 1B).

The elliptic cylindrical part 342 includes hooks 390 at both ends in the long side direction of the ellipse. Each of the hooks 390 is basically a plate section formed into an elliptic cylinder, projects from the end surface on the supporting part 341 side toward the supporting part 341 side in the electric cable hole direction, and elastically deforms in the long side direction, that is, the direction intersecting with the direction for dividing the lower component 340 and the upper component 331. The hooks 390 are formed so that the outer surfaces thereof extend along the outer peripheral surface of the elliptic cylindrical part 342. Each of the hooks 390 includes an inclined surface 391 that is inclined with respect to the electric cable hole direction so as to project outside from the outer peripheral surface of the elliptic cylinder forming the elliptic cylindrical part 342, and a vertical surface 392 that is a surface spreading from the terminal end of the inclined surface 391 toward the inner side in the long side direction so as to be parallel to the long side direction, that is, a surface vertical to the electric cable hole direction, which are arranged in the middle thereof in the electric cable hole direction. Between the initial end of the inclined surface 391 and the main body of the elliptic cylindrical part 342, in order to make the inclined surface 391 and the vertical surface 392 elastically deform easily in the long side direction, a long hole 393 is formed.

In the supporting part 341 of the lower component 340, concave parts 345 for the hooks 390, which are concave so as not to interfere with the hooks 390 even if the hooks 390 elastically deform by a desired amount, are formed around the hooks 390.

The upper component 331 has a supported part 334 that is supported by the supporting part 341 of the lower component 340, and a guiding part 335 that guides the plural electric cables 310 arranged at a position outside the supported part 334 and bundled by the second cover 380 so that the plural electric cables 310 extend toward the direction of one end of the shaft direction (downward in FIG. 14A).

On a lower surface 333 that is a surface on one end side in the shaft direction (surface on the lower side in FIGS. 14A) in the supported part 334 of the upper component 331, two convex parts 332 that project from the lower surface 333 toward the direction of one end of the shaft direction and that are formed into a cylinder are arranged in the long side direction of the ellipse of the elliptic cylindrical part 342. In addition, at the central part in the long side direction of the ellipse of the elliptic cylindrical part 342 on the lower surface 333, an electric cable passage (not shown) that forms a passage for the plural electric cables 310 bundled by the second cover 380 together with the electric cable passage 344 of the lower component 340 is formed. This electric cable passage is formed so as to make a space for making the plural electric cables 310 bundled by the second cover 380 pass through a space between the electric cable passage and the electric cable passage 344 of the lower component 340 in a state where the upper component 331 is attached to the lower component 340 and the lower surface 333 of the upper component 331 and the supporting surface 341b of the lower component 340 are in contact with each other.

In the supported part 334, concave parts 331a for the hooks 390, which are concave so as not to interfere with the hooks 390 even if the hooks 390 elastically deforms by a desired amount, are formed around the hooks 390.

The outer peripheral surfaces of the supported part 334 of the upper component 331 and the supporting part 341 of the lower component 340 are formed so as to have the same size as the outer peripheral surface of the elliptic cylindrical part 342 in a state where the convex parts 332 of the upper component 331 are fitted with the concave parts 341a of the lower component 340 and the lower surface 333 of the upper component 331 and the supporting surface 341b of the lower component 340 are in contact with each other.

The guiding part 335 projects outside from the end surface on the side opposite to the side where the grommet 320 of the supported part 334 is arranged, curves from the end surface toward the direction of one end of the shaft direction (downward in FIG. 14A), and covers a surrounding area of the plural electric cables 310 bundled by the second cover 380 in three directions. That is, a wall is not provided at a section facing the placement surface 344a of the electric cable passage 344 so that the guiding part 335 forms a passage together with the electric cable passage 344 of the lower component 340, and one end (lowermost part in FIG. 14A) in the shaft direction is open.

Each of the detachment preventing components 336 is arranged between corresponding one of the hooks 390 provided on both sides in the long side direction of the ellipse of the socket 330, and corresponding one of the concave parts 345 of the lower component 340 and corresponding one of the concave parts 331a of the upper component 331. The detachment preventing components 336 are an example of a deformation preventing component that is arranged inside the hook 390 in a state where the hook 390 is fitted with the concave part 162 formed in the second housing 160, thus preventing elastic deformation of the hook 390. Each of the detachment preventing components 336 has a base 336a that extends in the electric cable hole direction and that is formed into a cuboid, and a curved part 336b that extends toward the electric cable passage 344 from the end of the base 336a located on the outer side in the electric cable hole direction.

The base 336a has a lower projection 336c that projects from one end surface in the shaft direction (lower end surface in FIGS. 14A and 14B) to the lower side (lower component 340 side), an upper projection 336d that projects from the other end surface in the shaft direction (upper end surface in FIGS. 14A and 14B) to the upper side, and an inner projection 336e that projects from the end surface on the electric cable passage 344 side in the long side direction of the ellipse toward the electric cable passage 344. Each of these lower projection 336c, upper projection 336d and inner projection 336e has an inclined surface that is inclined with respect to the electric cable hole direction, and a vertical surface that extends from the terminal end of the inclined surface so as to be parallel to the direction vertical to the electric cable hole direction.

The curved part 336b has the inclined surface that is inclined with respect to the long side direction of the ellipse of the socket 330 at the tip and on the inner side in the electric cable hole direction. In the curved part 336b, a concave part 336f that is concave from the tip is formed at the central part of the curved part 336b in the shaft direction.

The harness comp 300 having the aforementioned configuration is assembled as described below.

That is, first, the electric cables 310 are inserted into the plural electric cable holes 323 formed in the grommet 320. Then, an adhesive material is applied to the inner side of the cylindrical part 322 of the grommet 320, and positioning is conducted so that the plural electric cables 310 are kept from moving with respect to the grommet 320. Further, the plural electric cables 310 are bundled by the first cover 370 and the second cover 380.

Then, the plural electric cables 310 bundled by the second cover 380 arranged on the cylindrical part 322 side of the grommet 320 are made to pass through the penetration hole 342a of the elliptic cylindrical part 342 of the lower component 340 of the socket 330, and are placed on the placement surface 344a of the electric cable passage 344 of the lower component 340. Thereafter, the upper component 331 is attached to the lower component 340. That is, the convex parts 332 of the upper component 331 are fitted with the concave parts 341a of the lower component 340, so that the lower surface 333 of the upper component 331 is made to come into contact with the supporting surface 341b of the lower component 340. As a result, the plural electric cables 310 bundled by the second cover 380 are guided toward the lower direction by the guide part 335 of the upper component 331, as shown in FIG. 13. In other words, in the harness comp 300 according to the exemplary embodiment, the plural electric cables 310 bundled by the second cover 380 are pressed by the upper component 331 and the lower component 340, and thereby the plural electric cables 310 are curved downward in the direction perpendicular to the electric cable hole direction that is the direction intersecting with the hole direction of the electric cable hole 323 of the grommet 320 (electric cable hole direction). In addition, in the inside of the socket 330, the plural electric cables 310 bundled by the second cover 380 are made to be curved by the electric cable passage 344 of the lower component 340 and the supported part 334 of the upper component 331 so as to be formed into a mound that is raised upward in FIG. 13. Note that, since the adhesive material is applied onto the inner side of the cylindrical part 322 of the grommet 320, even if any force is applied to the plural electric cables 310 when the upper component 331 of the socket 330 is fitted with the lower component 340, displacement of the electric cables 310 is suppressed.

Then, the tip of the plural electric cables 310 bundled by the second cover 380 is connected to the second connector 360. On the other hand, another tip of the plural electric cables 310 bundled by the first cover 370 arranged on the side opposite to the side where the cylindrical part 322 of the grommet 320 is arranged is connected to the first connector 350.

The harness comp 300 is attached to the electric power steering apparatus 100 as described below.

That is, the first rotary shaft 110, the second rotary shaft 120, the sensing device 10 and the like are attached to the first housing 150 and the second housing 160, and the harness comp 300 is made to pass through the communication hole 161 formed in the second housing 160 from the first connector 350 side before the third housing 170 is attached thereto. Then, the grommet 320 and the socket 330 are pushed into the communication hole 161 until the projections 324 of the grommet 320 are fitted with the inner peripheral surface of the communication hole 161 so as to come into contact with the communication hole 161 and the hooks 390 of the socket 330 are fitted with the concave parts 162 formed in the second housing 160. When the socket 330 is inserted into the communication hole 161, the inclined surfaces 391 of the hooks 390 elastically deform since the inclined surfaces 391 come into contact with the surrounding wall of the communication hole 161 of the second housing 160, and thereafter, when the socket 330 is further inserted thereinto, the inclined surfaces 391 are fitted with the concave parts 162 of the second housing 160 and recover from the deformation state. The grommet 320 moves to the inner side against frictional force generated between the grommet 320 and the peripheral wall 163 of the communication hole 161, since the surface on the side where the cylindrical part 322 is arranged in the elliptic cylindrical part 321 is pressed by the crescent cylindrical part 343 of the socket 330. As described above, the grommet 320 and the socket 330 are mounted on the second housing 160. Then, each of the detachment preventing components 336 is inserted into a space between the corresponding hook 390, and the concave part 345 of the lower component 340 and the concave part 331a of the upper component 331. Further, the first connector 350 is inserted into the terminal of the flat cable cover 60 and the second connector 360 is inserted into the terminal of the ECU 200.

On the other hand, in a case where the harness comp 300 is detached, after the first connector 350 is detached from the terminal of the flat cable cover 60, the grommet 320 and the socket 330 may be detached from the communication hole 161 of the second housing 160 by pulling out the detachment preventing components 336 and pulling the hooks 390 of the socket 330 from the outside of the second housing while the hooks 390 are made to elastically deform to the inner side. Since the concave part 336f is formed in the detachment preventing component 336, it is possible to detach the detachment preventing component 336 easily if a tip of a flathead screwdriver is inserted into the concave part 336f, for example. Thereafter, the first connector 350 is pulled out from the communication hole 161 of the second housing 160, and the harness comp 300 is detached.

Next, description will be given for the rotary component 21 and the magnet 22.

Figure 16:
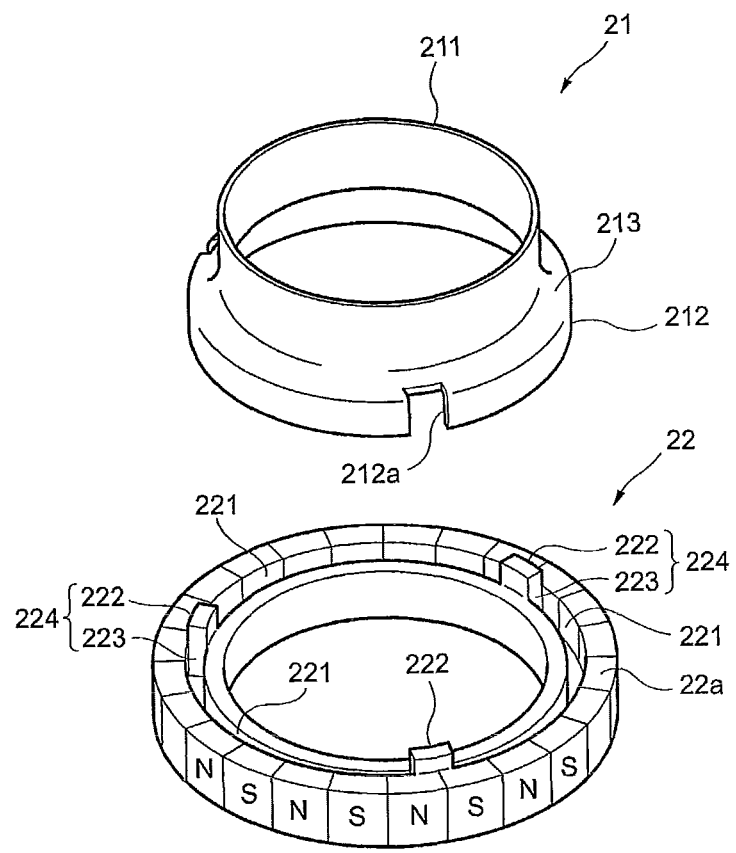
FIG. 16 is a perspective view of the rotary component and the magnet.
Figure 17:
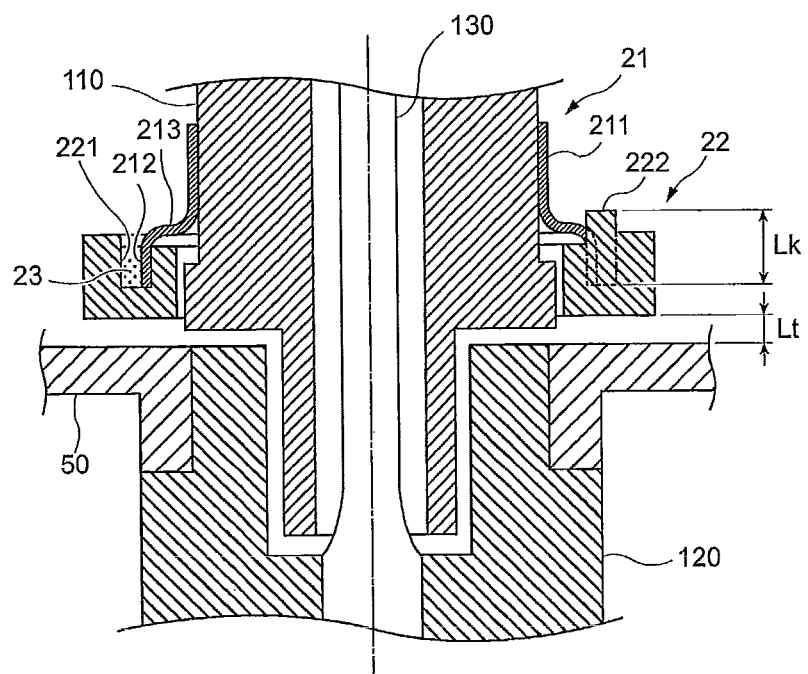
FIG. 17 is an enlarged view of a part denoted by XVII in FIG. 1.

FIG. 16 is a perspective view of the rotary component 21 and the magnet 22. FIG. 17 is an enlarged view of a part denoted by XVII in FIG. 1, The rotary component 21 is provided with: a first cylindrical part 211 that follows the outer circumferential surface of the first rotary shaft 110 and that is formed into a cylinder with a thin wall-thickness; a second cylindrical part 212 whose center line direction is set at the shaft direction of the first rotary shaft 110, and the second cylindrical part 212 having the inner diameter larger than that of the first cylindrical part 211 and formed into a cylinder with a thin wall-thickness; and a connecting part 213 that connects the first cylindrical part 211 and the second cylindrical part 212. In the second cylindrical part 212, plural cut-out parts 212a (three cut-out parts 212a in the exemplary embodiment) that are cut from the end on the second rotary shaft 120 side in the shaft direction of the first rotary shaft 110 are formed at regular intervals in the circumferential direction.

As the rotary component 21, a component formed by spinning of a plate may be exemplified. Examples of a method for providing the rotary component 21 on the first rotary shaft 110 include a method in which the first cylindrical part 211 of the rotary component 21 is inserted into the outer circumferential surface of the first rotary shaft 110 with pressure, and a method in which a concave part is provided on the outer circumferential surface of the first rotary shaft 110 and the rotary component 21 is fixed by making the first cylindrical part 211 elastically deform (swaged) along the shape of the concave part.

The magnet 22 is basically a cylindrical component, and includes plural groove parts 221 (three groove parts 221 in the exemplary embodiment) that are concave in the shaft direction from one end surface 22a of the first rotary shaft 110 in the shaft direction, and plural projections 222 (three projections in the exemplary embodiment) that project from one end surface 22a in the shaft direction. The projections 222 are arranged at sections where the groove parts 221 are not arranged in the circumferential direction, and are arranged around sections where the groove parts 221 are arranged in the radial direction. As shown in FIG. 16, there is no boundary between the end surface of the groove part 221 in the circumferential direction and the end surface of the projection 222 in the circumferential direction, and they are integrally formed. Since an intermediate part 223 between one groove part 221 and another groove part 221 in the circumferential direction and the projection 222 arranged on the intermediate part 223 are fitted with the cut-out part 212a of the rotary component 21, as described below, a combination of the intermediate part 223 and the projection 222 is referred to as a fitting part 224.

In the magnet 22, north poles and south poles are alternately arranged in the circumferential direction of the first rotary shaft 110, and the magnet 22 is magnetized in the circumferential direction. An example of the number of poles is 24 including 12 north poles and 12 south poles, as shown in FIG. 16. Alternatively, the magnet 22 may include one magnetized north pole and one magnetized south pole at the position facing the relative angle sensor 30.

Adhesion of the magnet 22 with an adhesive material 23 is conducted in a state where the second cylindrical part 212 of the rotary component 21 is inserted into the groove parts 221. Thereby, the magnet 22 is mounted on the first rotary shaft 110 through the rotary component 21, and rotates together with the first rotary shaft 110.

When the second cylindrical part 212 of the rotary component 21 is inserted into the groove parts 221 of the magnet 22, the fitting parts 224 of the magnet 22 and the cut-out parts 212a of the rotary component 21 are fitted with each other. By this configuration, rotative force of the first rotary shaft 110 is transmitted to the magnet 22 through the rotary component 21 even if support of the magnet 22 by the rotary component 21 is lost due to peeling of the adhesive material 23, because the magnet 22 comes into direct contact with the rotary component 21. That is, in the case where support of the magnet 22 by the rotary component 21 is lost due to peeling of the adhesive material 23, when the rotary component 21 rotates with rotation of the first rotary shaft 110, the rotative force of the first rotary shaft 110 is transmitted to the magnet 22 since the cut-out parts 212a of the rotary component 21 come into direct contact with the fitting parts 224 of the magnet 22. As a result, even in the case where support of the magnet 22 by the rotary component 21 is lost due to peeling of the adhesive material 23, the magnet 22 rotates with rotation of the first rotary shaft 110.

In order to prevent difference between the rotation angle of the first rotary shaft 110 and the rotation angle of the magnet 22 from occurring even in a case where support of the magnet 22 by the rotary component 21 is lost due to peeling of the adhesive material 23, difference between the width of the fitting part 224 of the magnet 22 in the circumferential direction and the width of the cut-out part 212a of the rotary component 21 in the circumferential direction is desirably zero. However, if the fitting part 224 of the magnet 22 and the cut-out part 212a of the rotary component 21 may be fitted with each other by hands of an operator, the width of the fitting part 224 in the circumferential direction may be larger than the width of the cut-out part 212a of the rotary component 21 in the circumferential direction.

From a standpoint of ease of assembly, it is desirable that the width of the fitting part 224 of the magnet 22 in the circumferential direction is narrower than the width of the cut-out part 212a of the rotary component 21 in the circumferential direction and a gap between the fitting part 224 and the cut-out part 212a is formed. In this case, if support of the magnet 22 by the rotary component 21 is lost due to peeling of the adhesive material 23, difference between the rotation angle of the first rotary shaft 110 and the rotation angle of the magnet 22 occurs, and thus the gap is desirably as small as possible. It is important that the gap is not large enough to prevent the magnet 22 from rotating together with rotation of the first rotary shaft 110 and from being assisted by the electric motor 190 even if the steering wheel is operated.

In addition, in the case where the width of the fitting part 224 of the magnet 22 in the circumferential direction is narrower than the width of the cut-out part 212a of the rotary component 21 in the circumferential direction and a gap between the fitting part 224 and the cut-out part 212a is formed, it is possible to suppress breakage of the magnet 22 at high temperature even if the magnet 22 has a higher expansion rate than the rotary component 21.

The length of the fitting part 224 of the magnet 22 in the shaft direction of the first rotary shaft 110 is set at the length sufficient to transmit, to the magnet 22 through the cut-out parts 212a of the rotary component 21, power necessary for the magnet 22 to rotate together with the first rotary shaft 110 even if support of the magnet 22 by the rotary component 21 is lost due to peeling of the adhesive material 23.

In the case where support of the magnet 22 by the rotary component 21 is lost due to peeling of the adhesive material 23, in the configuration according to the exemplary embodiment shown in FIGS. 1A, 1B and 17, the magnet 22 falls on the base 50 facing the end surface of the magnet 22 on the second rotary shaft 120 side in the shaft direction, and is placed on the base 50.

Figure 18:
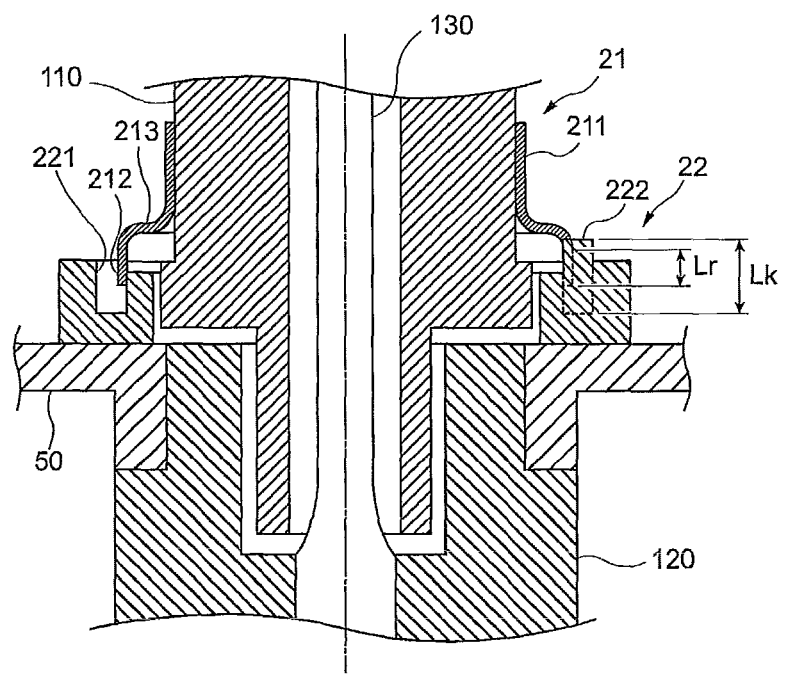
FIG. 18 is a view for illustrating a state where the magnet is placed on the base due to peeling of the adhesive material.

FIG. 18 is a view for illustrating a state where the magnet 22 is placed on the base 50 due to peeling of the adhesive material 23.

In the state where the magnet 22 is placed on the base 50, at least it is necessary that a positional relationship in which the end surface of the cut-out parts 212a of the rotary component 21 and the fitting parts 224 of the magnet 22 come into contact with each other is achieved, and they have overlapped length in the shaft direction sufficient to transmit, to the magnet 22, power necessary for the magnet 22 to rotate together with the first rotary shaft 110, by the contact between the end surface of the cut-out parts 212a of the rotary component 21 and the fitting parts 224 of the magnet 22. If the sufficient length is denoted by Lr (refer to FIG. 18), the length Lk of the fitting part 224 of the magnet 22 may be set at a value not less than (Lt+Lr) which is obtained by adding Lr to the gap Lt between the base 50 and the end surface of the magnet 22 on the second rotary shaft 120 side in the shaft direction (Lk≥Lt+Lr).

By forming the sensing device 10 as the aforementioned configuration, even if support of the magnet 22 by the rotary component 21 is lost due to peeling of the adhesive material 23, the magnet 22 rotates together with the first rotary shaft 110 since rotative force of the first rotary shaft 110 is transmitted to the magnet 22 through the cut-out parts 212a of the rotary component 21. Thus, even in the case of peeling of the adhesive material 23, it is possible to sense the relative rotation angle between the first rotary shaft 110 and the second rotary shaft 120.

Note that, in the configuration according to the exemplary embodiment, which is shown in FIGS. 1A, 1B and 17, only the base 50 faces the end surface of the magnet 22 on the second rotary shaft 120 side in the shaft direction. However, in a case where the second rotary shaft 120 and/or a component rotating together with the second rotary shaft 120 (including the base 50) face the end surface of the magnet 22 on the second rotary shaft 120 side in the shaft direction, a following configuration may be adopted. That is, in the case where support of the magnet 22 by the rotary component 21 is lost due to peeling of the adhesive material 23, the length Lk of the fitting part 224 of the magnet 22 may be set at the length not less than the length obtained by adding Lt that is a gap between the part where the magnet 22 is placed after falling down and the end surface of the magnet 22 on the second rotary shaft 120 side in the shaft direction in the state where the magnet 22 is supported by the rotary component 21 to Lr that is the contact length between the fitting part 224 and the cut-out part 212a sufficient to transmit rotative force of the first rotary shaft 110 to the magnet 22, that is, the length Lk meets Lk≥Lt+Lr.

Note that, in the electric power steering apparatus 100 according to the aforementioned exemplary embodiment, although the harness comp 300 using the socket 330 is provided as a component for suppressing movement of the grommet 320 holding the electric cables 310, it is not limited to the aforementioned configuration. For example, as a component for suppressing movement of the grommet 320, a plate that is arranged on the outside of the housing 140, that is screwed onto the housing 140, and that covers the outer communication hole 161*b* of the communication hole 161 may be used. In this case, a clip having a flat-plate part that sandwiches and supports the electric cables 310 and a hook that is inserted into a penetrating hole formed in the plate may be mounted on the plate through the hook, and may be kept in a state where the electric cables 310 are fastened by the flat-plate part. Thereby, even if external force is applied to the electric cables 310 at the outside of the housing 140, it is possible to make the force difficult to be transmitted to the part of the grommet 320 where the electric cables 310 are held.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relative angle sensing device that senses a relative rotation angle between a first rotary shaft and a second rotary shaft, the relative angle sensing device comprising:
    a rotary component that is provided on one rotary shaft out of the first rotary shaft and the second rotary shaft, and that rotates together with the one rotary shaft;
    a supported component that generates a magnetic field and that is supported by the rotary component through an adhesive material; and
    a sensor that is provided in the other rotary shaft out of the first rotary shaft and the second rotary shaft, and that outputs a value corresponding to the magnetic field generated by the supported component, wherein
    a convex part is provided in any one of the rotary component and the supported component and a concave part is provided in the other one of the rotary component and the supported component, and
    the supported component is supported by the rotary component through the adhesive material in a state where the convex part and the concave part are fitted with each other, and the rotative force of the one rotary shaft is transmitted by direct contact between the convex part and the concave part in the case of peeling of the adhesive material.

2. The relative angle sensing device according to claim 1, wherein a length of the convex part or the concave part provided in the supported component in a shaft direction of the one rotary shaft is not less than length obtained by adding, to contact length between the convex part and the concave part sufficient to transmit the rotative force of the one rotary shaft to the supported component, length between an end part of the supported component on the other rotary shaft side and the other rotary shaft on which the supported component is placed as a result of falling down in the case of peeling of the adhesive material and/or a component that rotates together with the other rotary shaft in a state where the supported component is supported by the rotary component through the adhesive material.

3. A relative angle sensing device that senses a relative rotation angle between a. first rotary shaft and a second rotary shaft, the relative angle sensing device comprising:
    a rotary component that is provided on one rotary shaft out of the first rotary shaft and the second rotary shaft, and that rotates together with the one rotary shaft;
    a supported component that generates a magnetic field and that is supported by the rotary component through an adhesive material; and
    a sensor that is provided in the other rotary shaft out of the first rotary shaft and the second rotary shaft, and that outputs a value corresponding to the magnetic field generated by the supported component, wherein
    a convex part is provided in any one of the rotary component and the supported component and a concave part is provided in the other one of the rotary component and the supported component; and
    the supported component is supported by the rotary component through the adhesive material in a state where the convex part and the concave part are fitted with each other.

4. The relative angle sensing device according to claim 3, wherein
    length of the convex part or the concave part provided in the supported component in a shaft direction of the one rotary shaft is not less than length obtained by adding, to contact length between the convex part and the concave part sufficient to transmit the rotative force of the one rotary shaft to the supported component, length between an end part of the supported component on the other rotary shaft side and the other rotary shaft on which the supported component is placed as a result of falling down in the ease of peeling of the adhesive material and/or a component that rotates together with the other rotary shaft in a state where the supported. component is supported by the rotary component through the adhesive material.

* * * * *

UNITED STATES PATENT AND TRADEMARK OFFICE
CERTIFICATE OF CORRECTION

PATENT NO.       : 8,901,922 B2
APPLICATION NO.  : 13/417942
DATED            : December 2, 2014
INVENTOR(S)      : Yusuke Hamaguchi and Yohei Hama Page 1 of 1

It is certified that error appears in the above-identified patent and that said Letters Patent is hereby corrected as shown below:

In the Claims, (Claim 3), Column 20, line 13, the "." should be deleted.

(Claim 4), Column 20, line 44, "ease" should be "case".

(Claim 4), Column 20, line 49, the "." should be deleted.

Signed and Sealed this
Fifth Day of May, 2015

Michelle K. Lee
*Director of the United States Patent and Trademark Office*